(12) United States Patent
Chiu

(10) Patent No.: US 8,351,004 B2
(45) Date of Patent: Jan. 8, 2013

(54) THREE DIMENSIONAL DISPLAY AND LENS THEREIN

(75) Inventor: Chung-Hsiang Chiu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 649 days.

(21) Appl. No.: 12/574,002

(22) Filed: Oct. 6, 2009

(65) Prior Publication Data
US 2010/0302490 A1 Dec. 2, 2010

(30) Foreign Application Priority Data

May 27, 2009 (TW) ................................ 98117812 A

(51) Int. Cl.
*G02F 1/1337* (2006.01)
(52) U.S. Cl. .......................... 349/126; 349/141; 349/142
(58) Field of Classification Search .................. None
See application file for complete search history.

(56) References Cited

U.S. PATENT DOCUMENTS

| 4,385,805 | A | 5/1983 | Channin | |
|---|---|---|---|---|
| 6,661,483 | B1 * | 12/2003 | Moriwaki et al. | 349/102 |
| 6,822,293 | B2 * | 11/2004 | Yamazaki et al. | 257/347 |
| 7,245,430 | B2 | 7/2007 | Kobayashi et al. | |
| 7,449,747 | B2 * | 11/2008 | Ishii et al. | 257/322 |
| 7,482,752 | B2 * | 1/2009 | Kang et al. | 313/584 |
| 2003/0020859 | A1 * | 1/2003 | Kaneko et al. | 349/139 |
| 2003/0063498 | A1 * | 4/2003 | Dray et al. | 365/200 |
| 2007/0296911 | A1 | 12/2007 | Hong | |
| 2009/0122210 | A1 | 5/2009 | Im | |

FOREIGN PATENT DOCUMENTS

| CN | 101097308 | 1/2008 |
|---|---|---|
| CN | 101419352 | 4/2009 |
| GB | GB 2439564 | 5/2008 |

OTHER PUBLICATIONS

English language translation of abstract of CN 101097308 (published Jan. 2, 2008).
English language translation of abstract of CN 101419352 (published Apr. 29, 2009).

* cited by examiner

*Primary Examiner* — Lucy Chien
(74) *Attorney, Agent, or Firm* — McClure, Qualey & Rodack, LLP

(57) ABSTRACT

A lens includes a first substrate, a second substrate and a medium layer. The first substrate includes a first electrode layer, an insulation layer, a second electrode layer and a first alignment layer. The first electrode layer includes first electrodes, and the second electrode layer includes second electrodes formed on the insulation layer. The second electrodes separately overlap the first electrodes, and one of the second electrodes shifts relatively to the corresponding first electrode toward a first direction. The first alignment layer is formed on the second electrode layer and has a first rubbing direction opposite to the first direction. The liquid crystal layer is disposed between the first substrate and the second substrate. A three-dimensional display is also disclosed herein.

19 Claims, 4 Drawing Sheets

THREE DIMENSIONAL DISPLAY AND LENS THEREIN

RELATED APPLICATIONS

This application claims priority to Taiwan Patent Application Serial Number 98117812, filed May 27, 2009, which is herein incorporated by reference.

BACKGROUND

1. Technical Field

The present disclosure relates to a lens. More particularly, the present disclosure relates to a liquid crystal lens in a three-dimensional display.

2. Description of Related Art

In a conventional three-dimensional display, a liquid crystal lens made by liquid crystals and electrodes usually has a disclination line effect therein after voltages are applied, due to the arrangement of the liquid crystals; in other words, the refractive index of the liquid crystal lens is obviously discontinuous. As a result, the aberration produced by the liquid crystal lens fails to meet the practical needs, and cross talk effects could thus arise when the three-dimensional display is operated to display images, causing quality of the displayed images to be poor.

SUMMARY

In accordance with one embodiment of the present invention, a lens is provided. The lens may be a liquid crystal lens. The liquid crystal lens includes a first substrate, a second substrate and a liquid crystal layer. The first substrate includes a first electrode layer, an insulation layer, a second electrode layer and a first alignment layer. The first electrode layer includes a plurality of first electrodes, and each of the first electrodes has a first virtual normal center line. The insulation layer is formed on the first electrode layer. The second electrode layer includes a plurality of second electrodes formed on the insulation layer, and each of the second electrodes has a second virtual normal center line, in which the second electrodes separately overlap the first electrodes and one of the second electrodes shifts relatively to the corresponding first electrode toward a first direction. The first alignment layer is formed on the second electrode layer and has a first rubbing direction, in which the first rubbing direction of the first alignment layer is opposite to the first direction. On the other hand, the second substrate includes a common electrode, and the liquid crystal layer is disposed between the first substrate and the second substrate.

In accordance with another embodiment of the present invention, a three-dimensional display is provided. The three-dimensional display includes the foregoing lens, a backlight module and a liquid crystal display panel disposed between the liquid crystal lens and the backlight module.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following detailed description, the embodiments of the present invention have been shown and described. As will be realized, the disclosure is capable of modification in various respects, all without departing from the disclosure. Accordingly, the drawings and description are to be regarded as illustrative in nature, and not restrictive.

Figure 1:
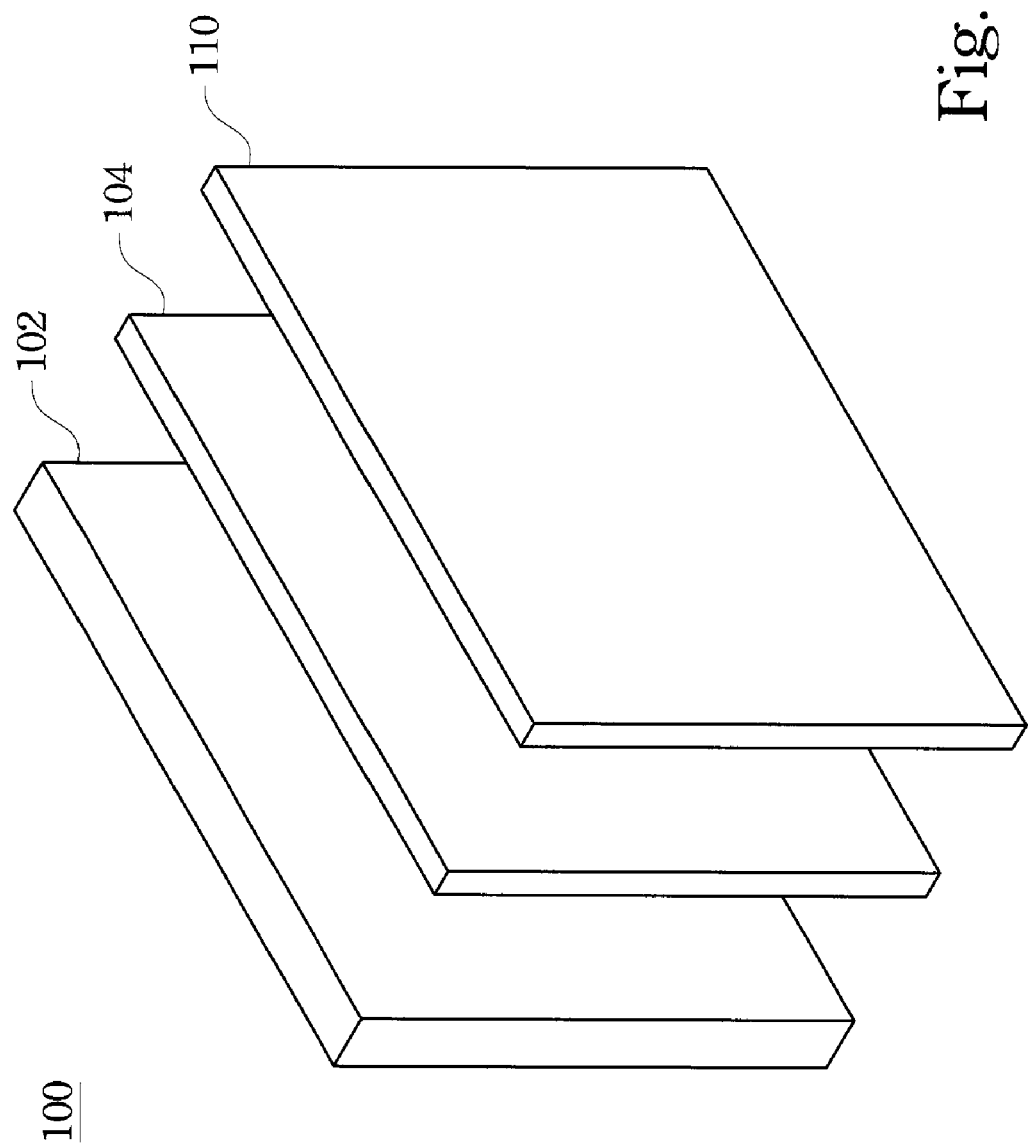
FIG. 1 illustrates a general diagram of a three-dimensional display in accordance with one embodiment of the present invention.

FIG. 1 illustrates a general diagram of a three-dimensional display in accordance with one embodiment of the present invention. The three-dimensional display 100 includes a backlight module 102, a liquid crystal display panel 104 and a lens 110, in which the liquid crystal display panel 104 is disposed between the lens 110 and the backlight module 102. However, the backlight module 102 and the liquid crystal display panel 104 may be replaced with other suitable self-emission display panel. The display panel 104 is disposed beneath the lens 110. When the lens 110 operates, the refraction angle of light passing through the lens 110 could change due to different voltages applied to the lens 110. Thus, after the light from the backlight module 102 and the liquid crystal display panel 104 passes through the lens 110, an observer can see the three-dimensional images with the sense of sight because the lens 110 changes the light path and produces aberration. In the present embodiment, the lens 110 may be a liquid crystal lens, for example.

Figure 2:
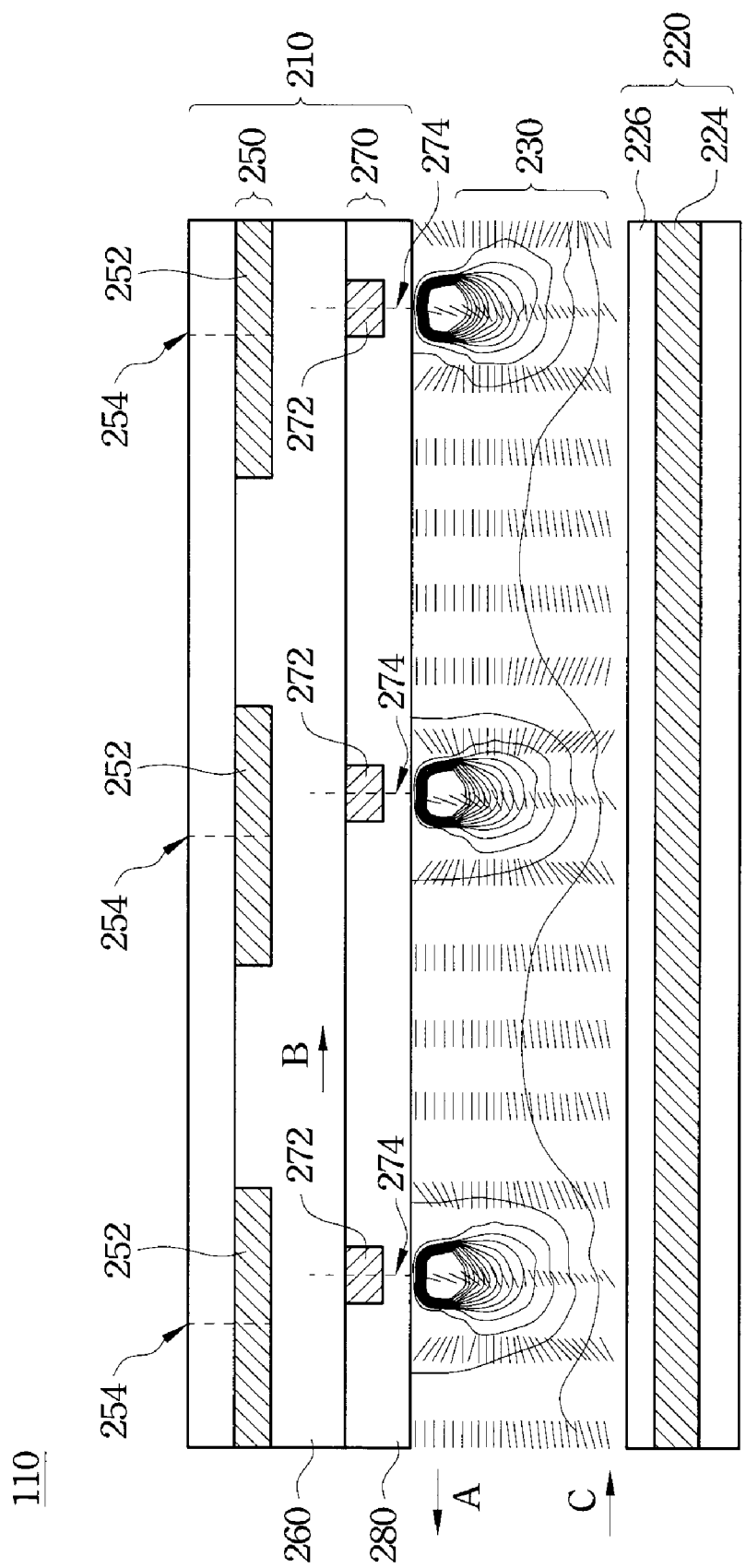
FIG. 2 illustrates the liquid crystal lens shown in FIG. 1 in accordance with one embodiment of the present invention.

FIG. 2 illustrates the liquid crystal lens shown in FIG. 1 in accordance with one embodiment of the present invention. The liquid crystal lens includes a first substrate 210, a second substrate 220 and a medium layer 230. The medium layer 230 may be a liquid crystal layer, other material, or insulator which may be of birefringence. The first substrate 210 includes a first electrode layer 250, an insulation layer 260, a second electrode layer 270 and a first alignment layer 280. The first electrode layer 250 includes a plurality of first electrodes 252 which are formed apart from each other for a predetermined space. Each of the first electrodes 252 has a first virtual normal center line 254 for determining the center position of each first electrode 252. The insulation layer 260 is formed on the first electrode layer 250 and can have a thickness of about 750 angstroms (Å) to about 1500 angstroms (Å). The second electrode layer 270 includes a plurality of second electrodes 272 which are formed on the insulation layer 260 and formed apart from each other for another predetermined space. Each of the second electrodes 272 has a second virtual normal center line 274 for determining the center position of each second electrode 272.

The foregoing first electrodes 252 and second electrodes 272 all include transparent conductive material, and the widths of the second electrodes 272 are smaller than those of the first electrodes 252. In other words, for a fixed lens pitch, the space between two adjacent first electrodes 252 is smaller than the space between two adjacent second electrodes 272. In one embodiment, the width of each first electrode 252 is about 25 micrometers (μm) to about 500 micrometers (μm), and the width of each second electrode 272 is about 2 micrometers (μm) to about 80 micrometers (μm). In another embodiment, the width of each first electrode 252 is approximately 50% of the lens pitch, and the width of each second electrode 272 is approximately 7% to 8% of the lens pitch.

Moreover, the foregoing second electrodes 272 are all disposed corresponding to the first electrodes 252 with an asymmetric manner and separated from the first electrodes 252 by the insulation layer 260. In present embodiment, the second electrodes 272 are all disposed to separately overlap the first electrodes 252, such that the projection of each second electrode 272 along the direction of the virtual normal center line overlaps the corresponding first electrode 252, and each second electrode 272 shifts relatively to the corresponding first electrode 252 toward a first direction. That is, the first virtual normal center line 254 of the first electrode 252 fails to align with the second virtual normal center line 274 of the second electrode 272 overlapping the first electrode 252.

On the other hand, the first alignment layer 280 is formed on the second electrode layer 270 and has a first rubbing direction formed by a rubbing fabrication process so that molecules, such as liquid crystal molecules, in the medium layer 230 can be arranged according to the preset order, in which the first rubbing direction of the first alignment layer 280 is opposite to the first direction described above. Specifically, as shown in FIG. 2, when the first rubbing direction of the first alignment layer 280 is referred to as direction A, the second electrode 272 shifts relatively to the corresponding first electrode 252 toward direction B which is opposite to direction A. In other words, the second electrode 272 shifts toward direction B based on the first virtual normal center line 254 of the first electrode 252.

In addition, the second substrate 220 in the lens 110 includes a common electrode 224 and a second alignment layer 226. The second alignment layer 226 is formed on the common electrode 224 and has a second rubbing direction formed by a rubbing fabrication process as well. The second rubbing direction is opposite to the first rubbing direction described above. As shown in FIG. 2, when the first rubbing direction of the first alignment layer 280 is referred to as direction A, the second rubbing direction of the second alignment layer 226 is referred to as direction C which is opposite to direction A.

Furthermore, the medium layer 230 is disposed between the first substrate 210 and the second substrate 220, and the molecules, such as liquid crystal molecules, in the medium layer 230 are controlled by various voltage differences between the first electrodes 252 and the common electrode 224, or between the second electrodes 272 and the common electrode 224.

In present embodiment, the voltage applied to the first electrodes 252 is smaller than the voltage applied to the corresponding second electrodes 272. The voltage difference between the first electrodes and the corresponding second electrodes can be about 0 volt to about 10 volts. For example, the voltage applied to the first electrodes 252 can be about 0 volt to about 5 volts, and the voltage applied to the second electrodes 272 can be about 0 volt to about 15 volts.

In one embodiment, the thickness of each of the first electrodes 252 is about 300 angstroms (Å) to about 2000 angstroms (Å), and the space between adjacent two of the first electrodes 252 is about 50 micrometers (μm) to about 1000 micrometers (μm); the thickness of each of the second electrodes 272 is about 300 angstroms (Å) to about 1000 angstroms (Å), and the space between adjacent two of the second electrodes 272 is about 50 micrometers (μm) to about 1000 micrometers (μm).

In another embodiment, the width of each of the first electrodes 252 is approximately 10% to 70% of the space between adjacent two of the first electrodes 252, and the width of each of the second electrodes 272 is approximately 5% to 10% of the space between adjacent two of the second electrodes 272.

In still another embodiment, the second virtual normal center line 274 of each of the second electrodes 272 and the first virtual normal center line 254 of the first electrode 252 corresponding thereto are spaced out about 1 micrometer (μm) to about 80 micrometers (μm) apart.

Figure 3:
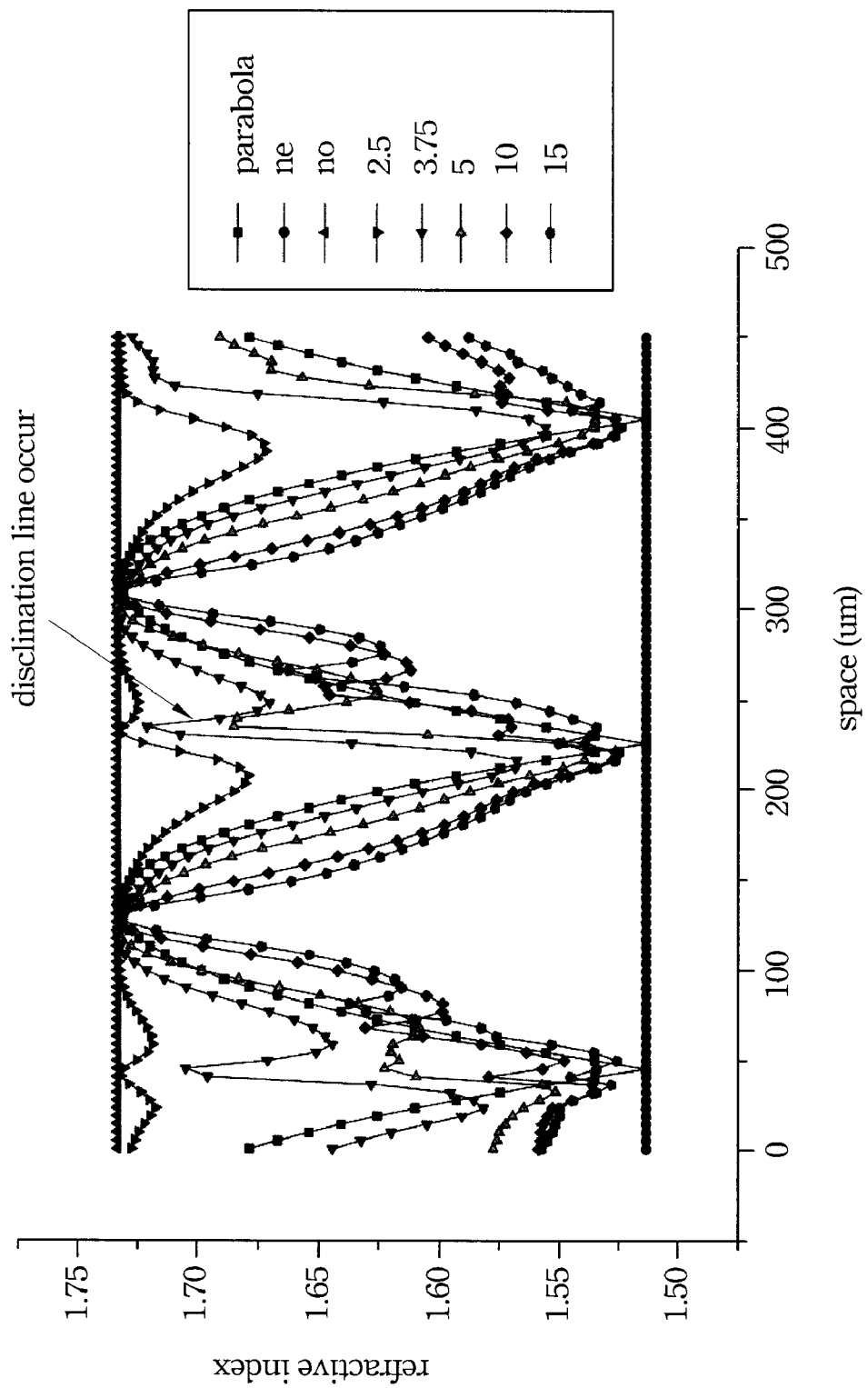
FIG. 3 illustrates the distribution of the refractive index in the liquid crystal lens of prior art.
Figure 4:
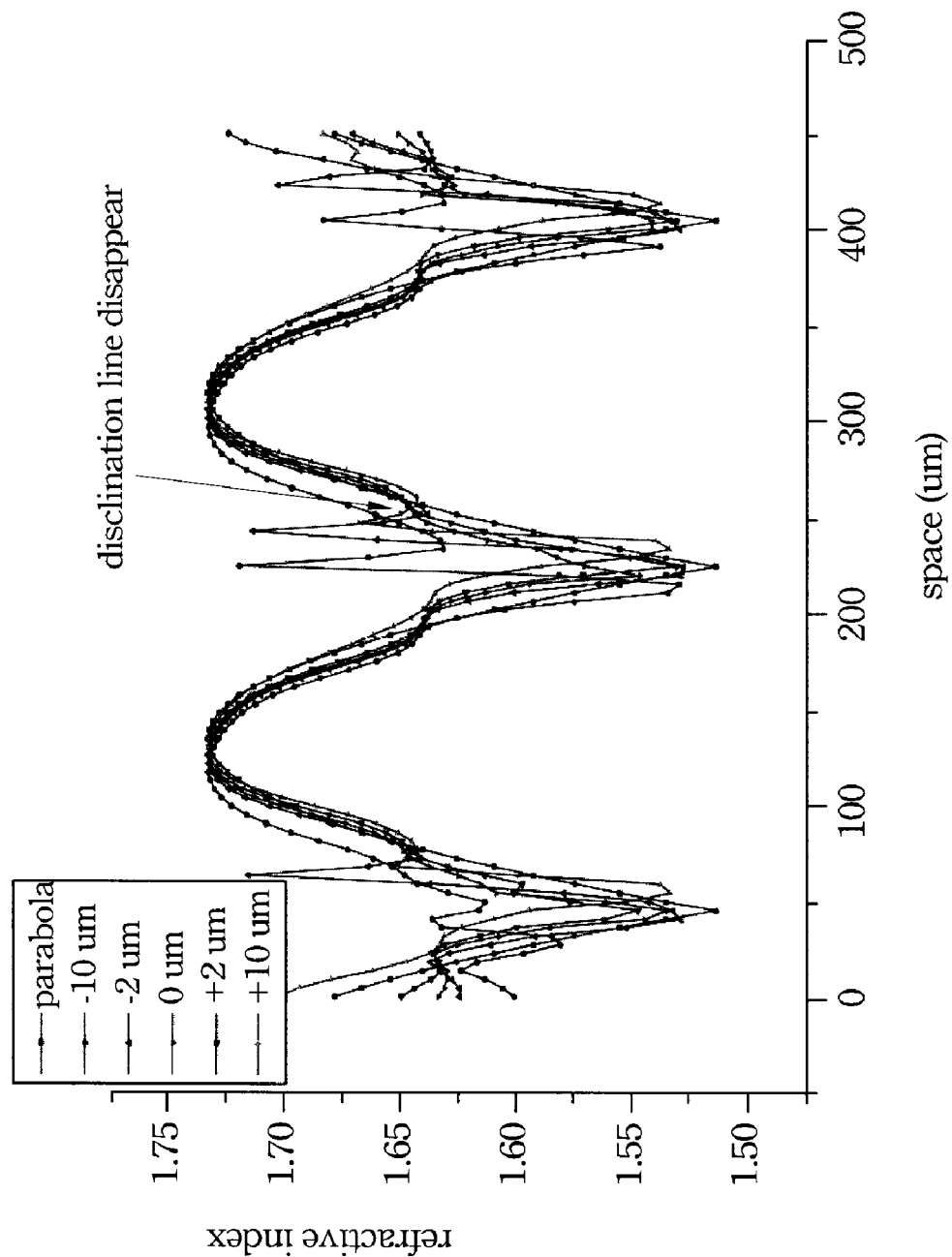
FIG. 4 illustrates the distribution of the refractive index in the liquid crystal lens in accordance with one embodiment of the present invention.

FIG. 3 illustrates the distribution of the refractive index in the liquid crystal lens of prior art. FIG. 4 illustrates the distribution of the refractive index in the liquid crystal lens in accordance with one embodiment of the present invention. Referring to FIGS. 2, 3 and 4, since the liquid crystal lens has the alignment layer such that liquid crystal molecules can be arranged according to the preset order, the liquid crystal molecules would incline before the voltage is applied. Thus, when the liquid crystal lens operates, the disclination line effect (as shown in FIG. 3) could be produced due to the arrangement of the liquid crystal molecules, causing the refractive index in the liquid crystal lens, which is expected to be in the form of continuous parabolic curve, to be discontinuous. Compared to FIG. 3, the electrodes of two different electrode layers are correspondingly disposed with an asymmetric manner in the liquid crystal lens in the embodiments of the present invention, so the rotations of the liquid crystal molecules can be concurrently controlled by the first electrodes 252 of the first electrode layer 250 and the second electrodes 272 of the second electrode layer 270 when the liquid crystal lens operates, thus preventing the distribution of the refractive index from being affected by the disclination line effect resulted from the preset arrangement of the liquid crystal molecules (as shown in FIG. 4). Furthermore, the potential isogram in the liquid crystal lens can thus be more symmetric when the voltage is applied to the electrodes.

For the foregoing embodiments, the three-dimensional display and the liquid crystal lens therein can be employed to not only prevent from producing the disclination line and improve the aberration quality of the lens, but also avoid from arising cross talk effects when the three-dimensional display is operated, to improve the quality of the displayed images.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A lens, comprising:
   a first substrate comprising:
   a first electrode layer comprising a plurality of first electrodes each having a first virtual normal center line;
   an insulation layer formed on the first electrode layer;
   a second electrode layer comprising a plurality of second electrodes formed on the insulation layer, each of the second electrodes having a second virtual normal center line, wherein the second electrodes separately overlap the first electrodes and one of the second electrodes shifts relatively to the corresponding first electrode toward a shift direction; and
   a first alignment layer formed on the second electrode layer and having a first rubbing direction, wherein the first rubbing direction of the first alignment layer is opposite to the shift direction;

a second substrate comprising a common electrode; and
a medium layer disposed between the first substrate and the second substrate.

2. The lens as claimed in claim 1, wherein the second substrate further comprises a second alignment layer formed on the common electrode, and the second alignment layer has a second rubbing direction opposite to the first rubbing direction.

3. The lens as claimed in claim 1, wherein a thickness of each of the first electrodes is about 300 angstroms to about 2000 angstroms.

4. The lens as claimed in claim 1, wherein a space between adjacent two of the first electrodes is about 50 micrometers to about 1000 micrometers.

5. The lens as claimed in claim 1, wherein a width of each of the first electrodes is about 25 micrometers to about 500 micrometers.

6. The lens as claimed in claim 1, wherein a thickness of each of the second electrodes is about 300 angstroms to about 1000 angstroms.

7. The lens as claimed in claim 1, wherein a space between adjacent two of the second electrodes is about 50 micrometers to about 1000 micrometers.

8. The lens as claimed in claim 1, wherein a width of each of the second electrodes is about 2 micrometers to about 80 micrometers.

9. The lens as claimed in claim 1, wherein the second virtual normal center line of each of the second electrodes and the first virtual normal center line of the first electrode corresponding thereto are spaced out about 1 micrometer to about 80 micrometers apart.

10. The lens as claimed in claim 1, wherein a width of each of the first electrodes is approximately 10% to 70% of a space between adjacent two of the first electrodes.

11. The lens as claimed in claim 1, wherein a width of each of the second electrodes is approximately 5% to 10% of a space between adjacent two of the second electrodes.

12. The lens as claimed in claim 1, wherein a voltage of the first electrode is smaller than that of the corresponding second electrode.

13. The lens as claimed in claim 12, wherein a voltage difference between the first electrode and the corresponding second electrode is about 0 volt to about 10 volts.

14. The lens as claimed in claim 12, wherein the voltage of the first electrode is about 0 volt to about 5 volts, and the voltage of the second electrode is about 0 volt to about 15 volts.

15. The lens as claimed in claim 1, wherein a thickness of the insulation layer is about 750 angstroms to about 1500 angstroms.

16. The lens as claimed in claim 1, wherein the medium layer comprises a liquid crystal layer.

17. A three-dimensional display, comprising:
a lens as claimed in claim 1; and
a display panel disposed beneath the lens.

18. The three-dimensional display as claimed in claim 17, further comprising a backlight module, wherein the display panel is disposed between the lens and the backlight module.

19. The three-dimensional display as claimed in claim 18, wherein the display panel is a liquid crystal display panel.

* * * * *